US012084287B2

(12) United States Patent
Jones et al.

(10) Patent No.: US 12,084,287 B2
(45) Date of Patent: Sep. 10, 2024

(54) TIRE ENHANCEMENT PRODUCT, PACKAGE AND METHOD

(71) Applicant: Griffin Bros., Inc., Albany, OR (US)

(72) Inventors: Matthew Jones, Silverton, OR (US); Ryan Kelly, West Linn, OR (US)

(73) Assignee: Griffin Bros., Inc., Albany, OR (US)

( * ) Notice: Subject to any disclaimer, the term of this patent is extended or adjusted under 35 U.S.C. 154(b) by 248 days.

(21) Appl. No.: 17/626,284

(22) PCT Filed: Jul. 8, 2020

(86) PCT No.: PCT/US2020/041271
§ 371 (c)(1),
(2) Date: Jan. 11, 2022

(87) PCT Pub. No.: WO2021/007364
PCT Pub. Date: Jan. 14, 2021

(65) Prior Publication Data
US 2022/0274132 A1 Sep. 1, 2022

Related U.S. Application Data

(60) Provisional application No. 62/872,979, filed on Jul. 11, 2019.

(51) Int. Cl.
B05D 7/22 (2006.01)
B05D 7/02 (2006.01)
B65G 43/02 (2006.01)
G06T 7/00 (2017.01)
G06T 7/11 (2017.01)
(Continued)

(52) U.S. Cl.
CPC ............... B65G 43/02 (2013.01); B05D 7/02 (2013.01); B05D 7/22 (2013.01); G06T 7/0004 (2013.01); G06T 7/11 (2017.01); G06T 7/13 (2017.01); G06T 7/254 (2017.01); B65G 15/00 (2013.01); B65G 2203/0233 (2013.01); B65G 2203/0283 (2013.01); B65G 2203/041 (2013.01);
(Continued)

(58) Field of Classification Search
CPC ........................................................ B05D 7/22
See application file for complete search history.

(56) References Cited

U.S. PATENT DOCUMENTS 3,881,943 A 5/1975 Fuller et al.
4,119,604 A 10/1978 Wysong
(Continued)

FOREIGN PATENT DOCUMENTS

GB 1032996 6/1966

OTHER PUBLICATIONS

Exam Report for Australian Application No. 2020310159, mailed Mar. 30, 2022, 4 pages.
(Continued)

Primary Examiner — Nathan H Empie
(74) Attorney, Agent, or Firm — Ganz Law, PC

(57) ABSTRACT

A tire-enhancement product has a container comprising a dissolvable packaging material; and a solute encased in the container that is inert to the solute. The container is configured to be placed in an interior volume of a tire, to which solvent can be added. The container is configured to dissolve when placed in a predetermined solvent, and the solute is configured to mix with the solvent to form a tire-enhancement mixture.

4 Claims, 6 Drawing Sheets

(51) Int. Cl.
*G06T 7/13* (2017.01)
*G06T 7/254* (2017.01)
*B65G 15/00* (2006.01)

(52) U.S. Cl.
CPC ............... *G06T 2207/10016* (2013.01); *G06T 2207/30108* (2013.01)

(56) References Cited

U.S. PATENT DOCUMENTS

| | | | |
|---|---|---|---|
| 5,728,209 | A | 3/1998 | Bury et al. |
| 6,280,528 | B1 | 8/2001 | Kharshan |
| 6,506,273 | B1 | 1/2003 | Hull |
| 7,977,298 | B2 | 7/2011 | Oldenhove et al. |
| 2003/0057401 | A1 | 5/2003 | Craig |
| 2005/0277712 | A1* | 12/2005 | Daly ..................... B60C 5/004 156/75 |
| 2006/0199750 | A1 | 9/2006 | Berger et al. |
| 2011/0028323 | A1 | 2/2011 | Shroff |
| 2013/0172226 | A1 | 7/2013 | Dreher et al. |
| 2014/0018278 | A1 | 1/2014 | Song et al. |
| 2015/0072915 | A1 | 3/2015 | Dreher et al. |
| 2016/0122691 | A1 | 5/2016 | Meek et al. |
| 2016/0304367 | A1 | 10/2016 | Gillespie et al. |
| 2018/0098927 | A1 | 4/2018 | Erkens et al. |
| 2019/0282461 | A1* | 9/2019 | Glassmeyer ......... A61K 8/8129 |

OTHER PUBLICATIONS

Office Action in U.S. Appl. No. 17/967,358, mailed Oct. 3, 2023, 13 pages.
Examination Report for Canadian Application No. 3, 146,832, mailed Oct. 17, 2022, 3 pages.
International Search Report and Written Opinion for PCT Application PCT/US2020/041271, mailed Sep. 30, 2020, 8 pages.
International Preliminary Report on Patentability for PCT Application PCT/US2020/041271, Jul. 20, 2021, 5 pages.

* cited by examiner

TIRE ENHANCEMENT PRODUCT, PACKAGE AND METHOD

FIELD

The inventive subject matter disclosed in and contemplated by this application (referred to as the "disclosure") generally concern tire enhancement products, packaging and methods. More particularly, but not exclusively, this disclosure pertains to packaged tire enhancement products that include a solute combinable with a liquid for treating or conditioning the internal volume of a tire, and methods of use.

BACKGROUND INFORMATION

Pneumatic tires may require certain treatments or conditioning to preserve the life of the tire and/or associated rim, or to provide other benefits from conditioning such as ballasting, leak repair, or leak detection. (Hereinafter, such products introduced in the interior volume or void defined by a tire and rim are referred to as "tire enhancement products".) In the case of large industrial and agricultural equipment such as mining and agricultural vehicles, corrosion of rims is a significant problem. The moisture, oxygen, and heat generated during vehicle operation combine to oxidize the rim. Various products can be added to the tire interior to reduce or prevent oxidation. The most commonly used products include solutions of sodium benzoate and sodium nitrite. The solution forms a protective film on the metal surfaces inside the tire, reducing oxidation and extending the life of the rim, as well as helping to avoid accidents from rim failures.

Hereinafter, anti-corrosion solutions will generally be used as a representative example of a tire enhancement product, but persons skilled in the art will understand that the principles of this disclosure apply equally well to other kinds of tire enhancement products.

Anti-corrosive solutions are typically shipped in large totes, e.g., as 275 gallon totes (approximately 1 kiloliter). The weight of such a tote is approximately 2500 pounds (approximately 1100 kg). The size and weight of the totes leads to high shipping costs, greater shipping logistics, increased handling, and limits the types of vehicles that can be used to transport the totes to larger freight haulers. Once on-site, the tote's volume requires large storage facilities, regardless of whether they are full or empty. The totes themselves are expensive, and once the totes are empty, there are few ways to dispose of them responsibly, all of which require that the totes be transported off-site. Recycling is possible, but there are few facilities available, and the costs are high. Totes are also prone to damage and leaking, which may damage the local environment and waste the purchaser's money. On the site where vehicles are located, the handling of the totes and application of the solutions contained therein can be cumbersome and inefficient due to the size and weight of the totes.

One alternative to shipping the tire enhancement products as a solution is to ship them as a dry powder with water or other solvent being added on site. While this seems like a simple solution to the noted problems, it is not practical or safe. This approach could result in imprecise, ineffective measurements of powder, and workers being exposed to powders that may be skin and lung irritants or otherwise hazardous.

Accordingly, there is a significant need for improved ways to package and transport tire-enhancement products, as well as improved ways of handling and applying the tire enhancement products on site. There are concomitant needs for safer, less expensive, more environmentally friendly, and more flexible tire packaged enhancement products than conventional processes.

SUMMARY

This disclosure addresses the foregoing and other needs in various embodiments

In general, a dry powder is encased in dissolvable packaging to form a container that is smaller and lighter than the conventional totes. The container and powder packaged therein may be placed in the void of the tire and rim, with water or other solvent readily available on site being supplied into the void to dissolve the container and solubilize the powder. The containers are accordingly less expensive to transport, and can be transported to a job site by a wider range of vehicles than possible for conventional totes. Further, the container needs less storage space and produce less waste than conventional totes. The containers provide metered doses of powder and are sealed so that workers do not come in contact with the powders. Thus, the contained tire enhancement products disclosed herein overcome many problems in the prior art and address one or more of the aforementioned or other needs.

In one possible embodiment, the inventive subject matter is directed to a tire-enhancement product having a container comprising a dissolvable packaging material; and a solute encased in the container that is inert to the solute. The container is configured to dissolve when placed in a predetermined solvent, and the solute is configured to mix with the solvent to form a tire-enhancement mixture.

The dissolvable packaging material can comprise at least one of: polyvinyl alcohol, polyvinyl pyrrolidone, polyalkylene oxide, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides, or natural gums.

The thickness of the dissolvable packaging material can be between about 0.5 mm and 3.5 mm.

The solute can comprise a salt comprising benzoate, nitrite, and/or chloride. In some examples, the solute comprises a mixture of sodium benzoate and sodium nitrite. In other examples, the solute comprises calcium chloride.

The solute can further include a dye.

The dissolvable packaging material can be dissolvable in water.

The solute can form a solution with the solvent. In other examples, the solute can form a suspension or a dispersion with the solvent. In still other examples, the solute can comprise a dry or liquid reagent and cause a chemical reaction in the solvent onsite to form a tire-enhancement product.

The solute can be anhydrous.

The solute can form a self-patching compound when mixed with the solvent.

The tire-enhancement mixture can comprise one of: a liquid, a paste, a gel, or a non-Newtonian fluid.

The solute can further include an anti-caking agent.

The solute can further include zeolites.

The solute can further include hydroxyethyl cellulose.

The tire-enhancement product can further include a moisture-proof package configured to receive the container and prevent moisture from contacting the dissolvable packaging material. The package can be sealed to prevent leakage of the solute.

In another embodiment, the inventive subject matter is directed to a method of making a tire-enhancement product, comprising portioning a weight of a tire-enhancement solute; and encasing the portion of solute in a dissolvable packaging material.

The method can further include enclosing one or more encased portions in a moisture-barrier material.

The method can further include placing the encased portion of tire-enhancement solute into an interior volume of a tire; attaching the tire to a rim of a wheel; and adding a volume of a solvent to the interior volume of the tire, wherein the dissolvable packaging material dissolves and the tire-enhancement solute mixes with the solvent to form a tire-enhancement mixture.

In the method, the ratio of solute weight to solvent volume can be about 0.07 kg per liter, or 0.6 pounds per gallon.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

Figure 1:
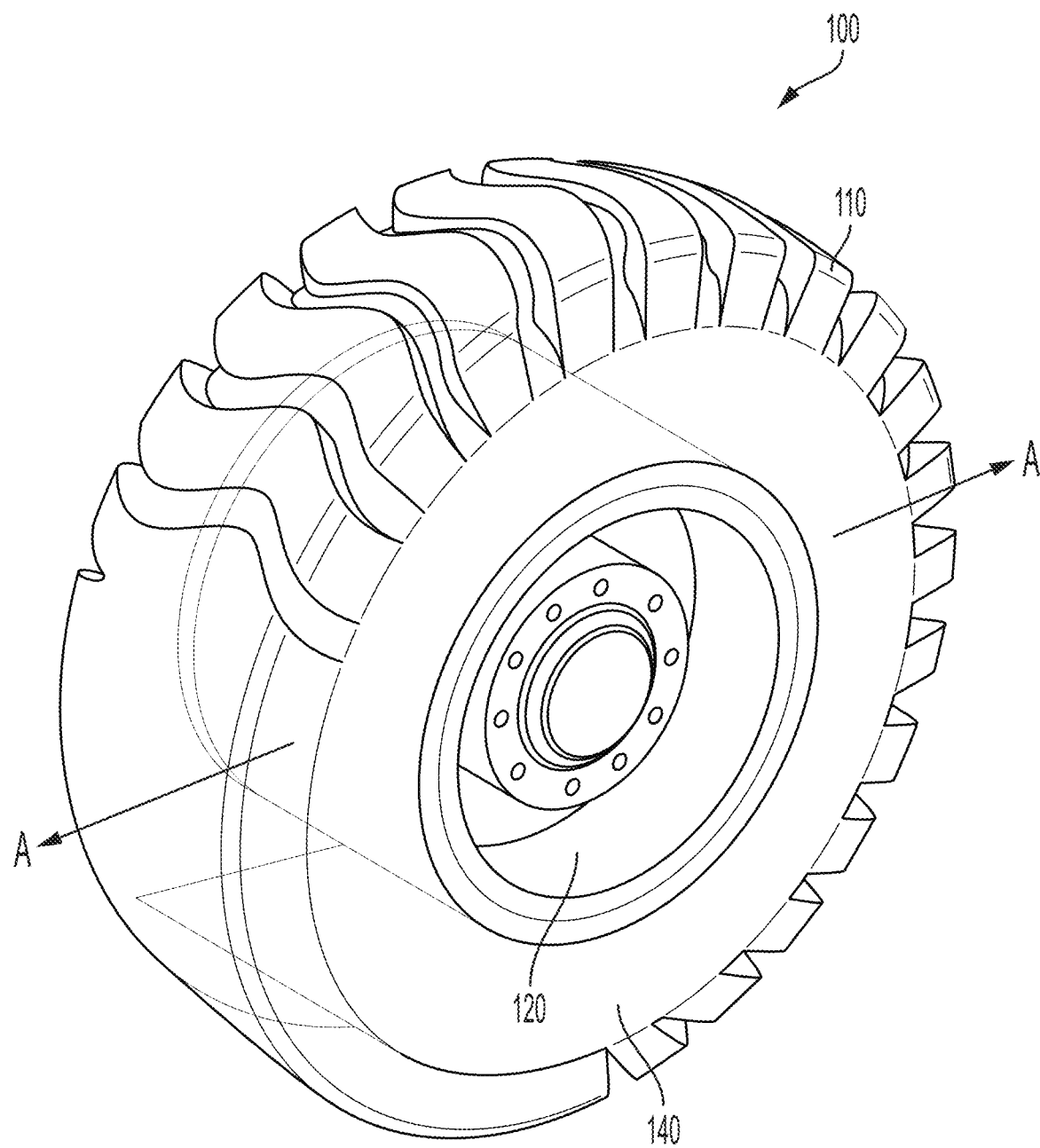
FIG. 1 illustrates a partial cutaway in perspective of a wheel as may be used with embodiments.

The following describes various principles related to tire enhancement products, packaging for the products, and methods of use. For example, some disclosed principles pertain to a dry solute, e.g., a powder, encased in dissolvable packaging that is smaller and lighter than the conventional totes. As but one illustrative example, powdered sodium benzoate and sodium nitrite in anhydrous powder form may be encased in a water-soluble container like polyvinyl alcohol packaging, which can be added to a tire interior with water onsite to create the tire-enhancement product. That said, descriptions herein of specific product and package configurations, and specific combinations of method acts, are but particular examples of contemplated products, packaging and methods chosen as being convenient illustrative examples of disclosed principles. One or more of the disclosed principles can be incorporated in various other products, packaging and methods to achieve any of a variety of corresponding, desired characteristics. Thus, a person of ordinary skill in the art, following a review of this disclosure, will appreciate that products, packaging and methods having attributes that are different from those specific examples discussed herein can embody one or more presently disclosed principles, and can be used in applications not described herein in detail. Such alternative embodiments also fall within the scope of this disclosure.

I. Overview

Wheels (tire and rim assemblies) for large industrial and agricultural vehicles such as off-the-road (OTR) vehicles, e.g., farming, construction, and mining vehicles, tend to be very large, compared to automobile wheels. OTR wheels often work remotely, in harsh conditions, and under heavy loads. OTR wheels are also very expensive, so prolonging their useful life is desirable. Various tire-enhancement products are available to preserve and extend the useful life of the OTR wheels by protecting and/or repairing the tire and/or the rim.

However, as noted above, the size and weight of conventional totes for anti-corrosive solutions, or similar tire-enhancement products, increases financial and environmental costs associated with their use. The majority of the weight comes with the addition of water, or other solvent, to the materials that create the tire-enhancement product.

Embodiments discussed herein provide smaller, lighter weight containers of a solute for shipment. The containers consist of a dissolvable casing. When the container is placed into a solvent, such as water, inside a tire, the container dissolves, and the solute mixes with the solvent to form the tire-enhancement product. In some embodiments, the solute may be an anhydrous powder or a dry powder. As used herein, "anhydrous" means a dissolvable solid, typically a powder, having substantially no water; and "dry" means a solid having substantially no liquid. Substantially "no water" or "no liquid" herein means that the product does not exceed 50% by weight water or liquid compared to weight of the solute (dissolved solid). In some embodiments that product does not exceed 25%, 10%, 5%, or 1% of water or liquid by weight compared to the weight of solute. A product may be considered dry or fully anhydrous if it has less than 1% by weight water or liquid or other solvent compared with the weight of the dissolved solid.

Because the containers of the solute are substantially smaller and lighter than the totes, as will be described, shipping costs can be greatly reduced. Further, because the packaging dissolves completely, there is no packaging to dispose of, other than materials used to create bundles of containers, e.g., plastic bags and/or cardboard boxes.

II. Product and Packaging

Examples of the product, packaging and methods of use will be described in the context of the accompanying figures.

FIG. 1 illustrates a partial cutaway in perspective of a wheel 100 such as may be used with a tire-enhancement product. The wheel 100 may include a tire 110 and a rim 120. The tire 110 may be removably attached to the rim 120. The interior volume of the tire 110 may contain a tire-enhancement product 140. The deployed tire-enhancement product 140 is a non-solid, typically a liquid, such as, for example, water containing dissolved sodium nitrite and sodium benzoate. In other embodiments, the product 140 may be in the form of a paste, a gel, or a non-Newtonian fluid, which can dissolve or disperse a solute.

The tire enhancement product 140 may be a single product or blend of products. For example, product 140 may include a dye, as well as anti-corrosion agents. When fissures or cracks are present in the rim 120, the product 140 may seep or leak from the wheel through the fissures or cracks to an exterior surface of the rim. When the dye dries, it may visibly indicate the presence and location of the fissures or cracks. Of course, the tire enhancement product could simply be the dye without any other tire enhancer.

As another example, the product 140 may also include an anti-freeze, such as propylene glycol, to prevent the liquid from freezing in cold environments.

Other tire-enhancement products 140 can include, for example and without limitation, liquid tire ballast, e.g., calcium chloride dissolved in water; or a tire patching compound.

Figure 2:
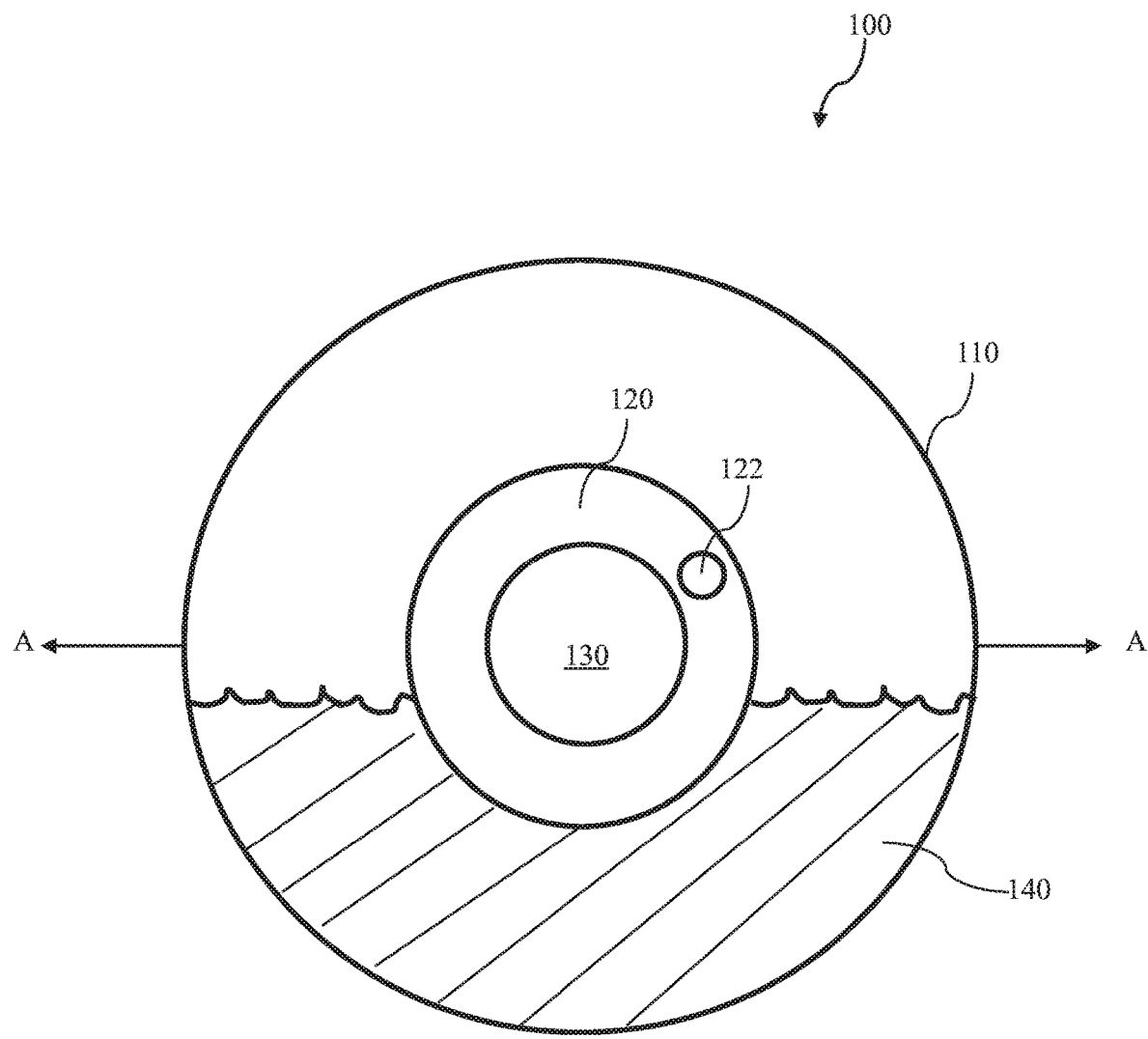
FIG. 2 illustrates a cross-section of the wheel show in FIG. 1.

FIG. 2 illustrates a cross-section of the wheel 100 taken along the line A-A. In addition to the tire 110, and the rim 120, the tire 110 can include a hub 130. The rim 120 houses the hub 130, which is attachable to an axle of the vehicle. The rim 120 also includes a valve stem 122, which allows air or other fluids to be pumped into, or released from, the interior volume of the tire 110.

The amount of product 140 used in a tire may vary according to factors such as the purpose of the product and expected conditions inside the tire volume. For example, if the product 140 comprises tire ballast, the tire volume may be filled at least halfway, for example. If the product 140 comprises an anti-corrosive solution, the tire volume may be filled less than halfway, but to a level that is sufficient to allow the solution to contact the portions of the rim that are exposed in the tire volume. For example, the solution may be deep enough in the tire volume to contact at least the bottom of the rim even when the wheel is not turning. Alternatively, the solution may not be deep enough to contact the rim when the wheel is not moving, but may splash or slosh sufficiently against the rim when the wheel is turning to provide the anti-corrosive coating.

Figure 3:
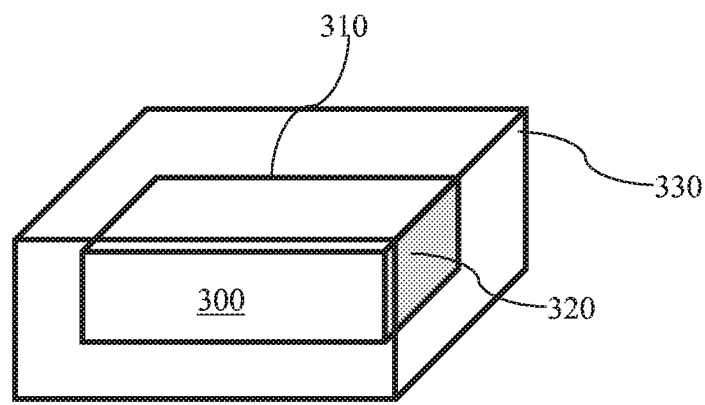
FIG. 3 illustrates an example of a container according to embodiments.

FIG. 3 illustrates an example of a container 300. The container 300 may comprise a chamber defined by walls of a dissolvable packaging material 310. The container 300 may include a solute 320 encased in the chamber formed by the dissolvable packaging material 310. The dissolvable packaging material 310 may be inert to the solute, meaning that the solute does not dissolve the packaging material 310. The container 300 may be sealed to prevent the solute from leaking or spilling out of the container 300. The solute 320 may be vacuum sealed within the packaging material 310, in some embodiments. In other embodiments, some quantity of air or other gas may be present with the solute 320 within the packaging material 310. In some embodiments, the container 300 may be hermetically sealed.

Although depicted as a generally rectangular volume, the container 300 may have any other shape, such as, for example, spherical, pyramidal, or ovoid. In practice, a shape that permits multiple containers to be stacked or packed together closely while minimizing empty space may be preferred. In some embodiments, the packaging material 310 may be shaped to include a handle for ease of transport. In still other embodiments, the container 300 may be shaped with a narrower portion, such as a neck or waist, to provide an area to grasp the container by a human operator or by a mechanical grasper.

Figure 4:
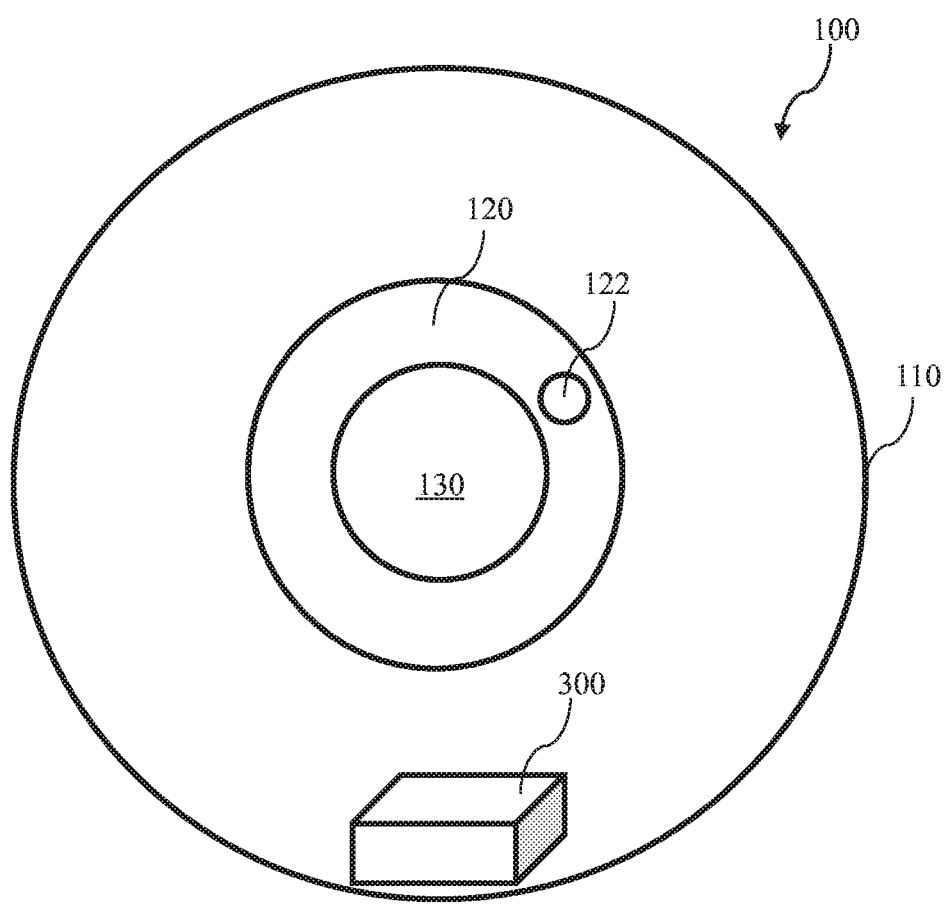
FIG. 4 illustrates a container placed inside a tire volume.

As shown in FIG. 4, one or more containers 300 may be placed inside the interior volume or void defined by the tire and rim. For example, it may be placed inside the tire 110. The tire 110 may then be attached to the rim 120. This can be done at a work site, for example, when a new tire is placed on a rim of a vehicle. Or a tire and rim assembly could be partially separated to allow placement of one or more containers 300 in the interior volume of the tire 110. Then, the solvent can be added to the tire volume through the valve 122. When the solvent contacts the dissolvable packaging material 310, the material 310 dissolves, exposing the solute 320 to the solvent. The solute 320 then mixes with or disperses into the solvent to create the tire-enhancement product. As used herein, a "solute" refers generally to a solid substance that dissolves into a solvent, a miscible liquid, and also to substances that form a suspension, a dispersion, or are otherwise uniformly distributed within a solvent. For purposes of this application, a dry or liquid reagent in a chemical reaction that occurs in a higher volume of the solvent onsite may also be referred to as a solute.

Water is generally the most commonly used solvent in tire-enhancement products, as it is safe to store and transport, and is generally inexpensive. However, other solvents, such as, for example, organic solvents, polar solvents, or non-polar solvents, may be used with the packaging and methods described herein, provided that the solvent dissolves the packaging material and becomes a component of the tire-enhancement product, without damaging the tire or rim material. Accordingly, this disclosure contemplates the use of both aqueous and non-aqueous solvents to dissolve, suspend, react with, or disperse solutes for tire enhancement.

Returning to FIG. 3, the packaging material 310 may include any material that is dissolvable in the selected solvent. The packaging material 310 serves to keep the solute encased within it dry, and to prevent the solute from spilling during transport. The packaging material 310 also protects the human operators who handle the containers, because the components of the solute may be hazardous.

In an embodiment, the dissolvable packaging material comprises a water-soluble material. Polymers, copolymers or derivatives thereof suitable for use as water soluble packaging material can be selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More particularly, suitable polymers may be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and suitably selected from polyvinyl alcohols, polyvinyl alcohol copolymers and hydroxypropyl methyl cellulose (HPMC), and combinations thereof. The level of polymer in the packaging material, for example a PVA polymer, can be at least 60%. The polymer can have any weight average molecular weight, such as from about 1000 to about 1,000,000, or even from about 10,000 to about 300,000, or even from about 20,000 to about 150,000.

Mixtures of polymers can also be used as the packaging material. This can be beneficial to control the mechanical and/or dissolution properties of the container, depending on the application thereof and the required needs. Suitable mixtures include, for example, mixtures where one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000 to about 40,000, or even about 20,000, and of PVA or copolymer thereof, with a weight average molecular weight of about 100,000 to about 300,000, or even about 150,000. Also suitable are polymer blend compositions, for example, comprising hydrolytically degradable and water-soluble polymer blends such as polylactide and polyvinyl alcohol, obtained by mixing polylactide and polyvinyl alcohol, typically comprising about 1 to about 35% by weight polylactide and about 65% to about 99% by weight polyvinyl alcohol. Polymers that are from about 60% to about 98% hydrolysed, or even about 80% to about 90% hydrolysed, are also suitable to improve the dissolution characteristics of the material.

The thickness of the dissolvable packaging material may be selected according to the size and weight of the package. For example, smaller, lighter weight containers may need less thickness relative to larger, heavier containers. The thickness of the dissolvable packaging material 310 may be between about 0.5 mm and 3.5, e.g., 0.55, 0.75, 0.85, 1.0, 1.2, 1.7, 1.9, 2.2, 2.8, 3.1 and 3.4 mm. However, the thickness should be sufficiently thin to dissolve completely into the solvent within a working timeframe, e.g., within 5 minutes, 10 minutes, 15 minutes, to minimize the time that the rim is exposed to corrosive conditions. Generally, a thicker container will take longer to dissolve relative to a thinner container. However, the heat present in an operating wheel may increase the speed of dissolution. In some cases, e.g., when the solvent and/or ambient temperature is cold, e.g., below 21 C (70 F), the packaging material may not fully dissolve until the temperature within the tire rises during vehicle operation. In some embodiments, the dissolvable packaging material dissolves at temperatures below about 37.8 C (100 F). In other embodiments, the dissolvable packaging material begins to dissolve immediately in contact with the solvent, but may not dissolve completely until the solvent reaches about 48 C (120 F).

An individual container 300 may include a portion of solute at a specific weight, and containers of differing sizes may be provided. For example, some containers may include 1 pound (0.45 kg), 3 pounds (1.36 kg), 5 pounds (2.27 kg), 6 pounds (2.7 kg), or 8 pounds (3.62 kg) of solute. The embodiments are not limited to these examples. Providing the containers at pre-measured weights may reduce operator error in creating the tire-enhancement product. Only the solvent amount needs to be measured, and many pump mechanisms provide a metering system to inform an operator of how much liquid has been pumped.

The solute may comprise a salt. For example, in this case of anti-corrosion agents, the salt may be a benzoate salt, a nitrite salt, and/or a chloride salt. For example, a mixture of sodium benzoate and sodium nitrite may form an anti-corrosive product when dissolved in water. In various embodiments, the ratio of benzoate salt parts to nitrite salt parts may range, for example, between 6:1 to 9:1, between 6.5:1 to 8.5:1, or between 7:1 to 8:1. One suitable example of a ration of sodium benzoate to sodium nitrite may be approximately 7.7 parts sodium benzoate to 1 part sodium nitrite. Alternatively, the solute may be calcium chloride, which produces tire ballast when dissolved in water.

The solute may include other additives, such as zeolites. Zeolites are hydrated aluminosilicates which act as an anti-caking agent in the solute, improving the dissolvability of the solute. Zeolites may also absorb liquid dye, when present. The zeolites may also form a protective moisture barrier inside the packaging material, which may slow degradation of the packaging material if the packaging material is exposed to humid air. Zeolites may also soften hard water. This allows whatever water is available on site to be used, rather than having to ship water to the site. Other anti-caking agents may be used.

The solute may include hydroxyethyl cellulose. Hydroxyethyl cellulose may aid in film formation, for better coating of the rim surfaces. Hydroxyethyl cellulose may also improve emulsification of other ingredients in the product. Around a solvent's freezing point temperature, hydroxyethyl cellulose prevents the solvent mixture from freezing to a solid block. Instead, it creates a slush, and is solubilized when the vehicle begins operation, where the pressure and heat inside the tire volume melts the slush. Other solutes that produce a slush instead of allowing the solvent to freeze may be used.

The solute may include any combination of the above-described materials. The solute may include, in addition or in the alternative, other materials that provide similar functionality as described above, or that provide additional functions as a tire-enhancement product such as lubrication or temperature-lowering; or improve shelf-life, stability, or other aspects of the packaged solute.

In addition to, or instead of, solute, the container 300 may include non-soluble materials, such as fibers or particles that are configured to mix with the solvent to form a suspension or dispersion. For example, a self-patching compound may comprise a suspension of fibers or particles in the solvent. The fibers or particles may fill cracks or holes in the tire.

For transport and storage purposes, one or more containers 300 may be optionally placed inside a moisture-proof, non-dissolvable, removable package 330 that is configured to receive the container 300 and prevent moisture, e.g., water vapor or liquid water, from contacting the dissolvable packaging material and degrading. They may also protect the container from damage. The package 330 may be, for example, a plastic bag, plastic wrap, shrink-wrap, plastic box, or any other flexible or rigid material configured to prevent the transfer of moisture through the material. The package 330 may be closed or sealed to prevent moisture from entering the package 330 through its opening. The package 330 is shown larger than the container 300 for clarity. In practice, the package 330 may be configured to allow little to no air between the inside of the package 330 and the outside of the container 300. Package 330 is removed from container(s) 300 before deployment of a container 300 into a wheel.

Figure 5:
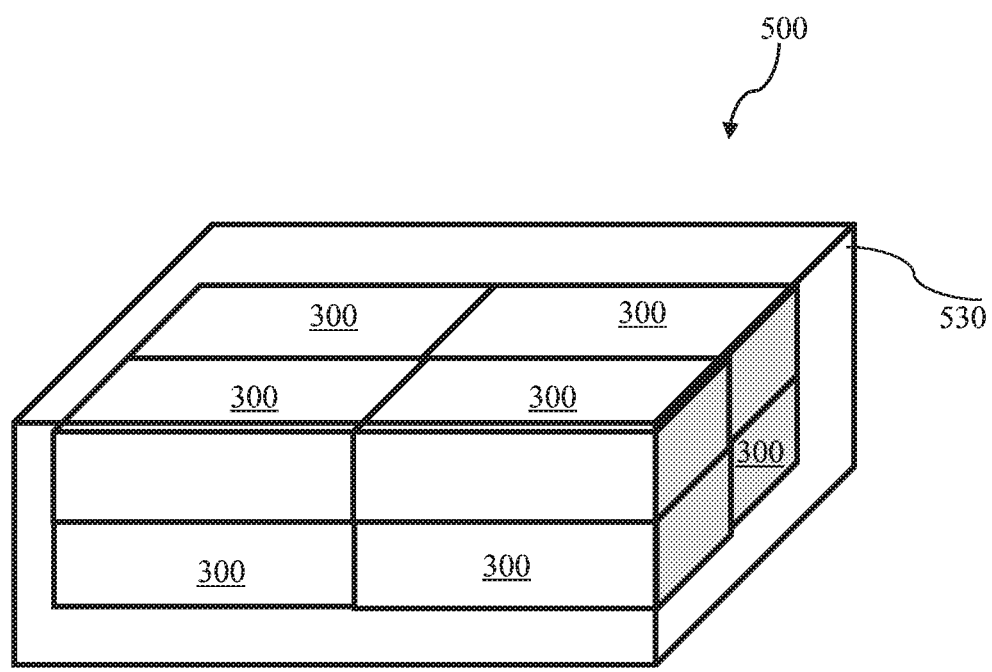
FIG. 5 illustrates a bundle of individual containers.

FIG. 5 illustrates a bundle 500 of individual containers 300. A bundle may include two or more containers. If the individual containers are not contained in individual moisture-proof packages, a bundle 500 may be placed in a moisture-proof package 530 that is configured to receive the bundle 500 and prevent moisture, e.g., water vapor or liquid water, from contacting the dissolvable packaging material. The moisture-proof package 530 may comprise, for example, one or more layers of plastic wrap, shrink wrap, or a plastic bag. The package 530 may additionally serve to keep the bundled containers from sliding apart from each other or falling off of the bundle. A bundle in a package 530 may be placed into a shipping container, such as a cardboard box or other container that provides some protection from punctures or tears, for transport and storage.

By way of comparison, conventional 275-gallon totes may have exterior dimensions of 48 inches, by 40 inches, by 46 inches. A 20-foot-long shipping container can hold 10 totes, and a 40-foot-long container can hold 20 totes. 10 totes, at 2500 pounds each, weigh 25,000 pounds. In contrast, one box of containers may weigh, for example, about 36 pounds, e.g., may hold 6 6-pound containers; 12 3-pound containers; or some combination thereof. 84 boxes of containers may then weigh about 3,000 pounds and can be shipped on one wooden pallet. One pallet's worth of boxes may occupy about the same volume of one tote. However, the containers in 84 boxes can produce the equivalent of almost 13 totes' worth of solution. Rather than needing to transport a large shipping container, the 84 boxes or a subset thereof can be transported to a job site in an automobile, sport-utility vehicle, or small truck. In addition, once all of the containers on a job site are used, the only waste is a plastic bag and a recyclable cardboard box.

III. Method of Using

Once the containers are on-site, an operator may place one or more containers 300 into a tire volume. The tire may be attached to a rim. The operator may add a volume of solvent to the interior volume of the tire, e.g., through the valve. The volume of solvent to add may be determined by the size of the tire. The weight of the solute, and thus the number of containers, to add to the tire may be determined according to the volume of solvent added to the tire. In environments that reach freezing temperature for the solvent, the operator may add an anti-freeze substance, such as propylene glycol, to the interior tire volume as well.

Figure 6:
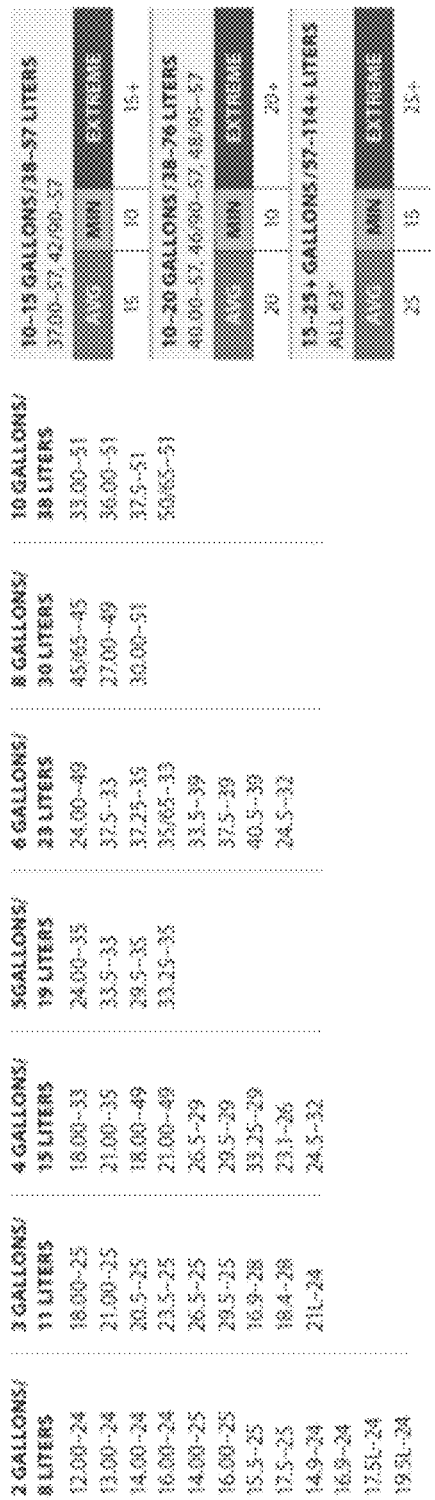
FIG. 6 shows a chart that relates solvent amounts to various tire sizes, for use with a tire-corrosion solution.

Off-the-road (OTR) tires vary in size and thus vary in the amount of solvent that they can hold. FIG. 6 shows a chart that relates solvent amounts to various tire sizes, for use with an exemplary tire-corrosion solution. In the illustrated example, the volume of solvent to add may range between about 8 liters to 114 liters or more (2 to 25 or more gallons). In various embodiments, the ratio of powder weight to solvent volume may range, for example, between 0.007 kg/liter to 0.7 kg/liter, between 0.035 kg/liter to 0.35 kg/liter, or between 0.017 kg/liter to 0.17 kg/liter. One suitable example of a ratio of an anti-corrosive solute weight to a water volume is about 0.07 kg/liter (0.6 pounds/gallon). In practice, for example, 5 gallons may be added to a 3-pound bag, or 10 gallons may be added to a 6-pound bag. Multiple bags can be added to a single tire as needed to achieve the desired amount and concentration of tire-enhancement product. The ratio of solute weight to solvent volume may differ according to the type of solute. For example, the ratio of a tire ballast solute weight to water volume may differ from the anti-corrosion solute ratio, both of which may differ from the ratio of a tire-patching solute weight to a solvent volume.

The wheel may be mounted onto the vehicle, before or after filling with the solvent. The operation of the vehicle generates heat in the tires, which serves to completely dissolve the dissolvable packaging material, and dissolve, mix or otherwise create the tire-enhancement product from the solute and the solvent.

IV. Other Exemplary Embodiments

The examples described above generally various principles related to tire enhancement products, packaging for the products, and methods of use. The previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, other powders, solvents, and/or dissolvable packaging materials could be used.

As used herein, "and/or" means "and" or "or", as well as "and" and "or." Moreover, any patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of tire enhancement products, packaging for the products, and methods of use. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of tire enhancement products, packaging for the products, and methods of use that can be devised under disclosed and claimed concepts.

Moreover, nothing disclosed herein is intended to be dedicated to the public regardless of whether such disclosure is explicitly recited in the claims. To aid the Patent Office and any readers of any patent issued on this application in interpreting the claims appended hereto or otherwise presented throughout prosecution of this or any continuing patent application, applicants wish to note that they do not intend any claimed feature to be construed under or otherwise to invoke the provisions of 35 USC 112(f), unless the phrase "means for" or "step for" is explicitly used in the particular claim.

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more".

Thus, in view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

The invention claimed is:

1. A method of making a packaged an anti-corrosive tire-enhancement product, comprising:
    portioning a weight of a solute comprising a tire-enhancement anti-corrosion solute, wherein the solute further comprises at least one of zeolites or hydroxyethyl cellulose;
    providing a container having an interior space defined by walls of a dissolvable packaging material;
    encasing the portion of anti-corrosion solute in the interior space defined- by the walls of the dissolvable packaging material, wherein the interior space defined by the walls of the dissolvable packaging material does not contain non-soluble material in a sufficient amount to serve as a tire sealant; and
    further comprising:
    placing the container with the encased portion of anti-corrosion solute into an interior volume of a tire;
    attaching the tire to a rim of a wheel; and adding a volume of a solvent to the interior volume of the tire, wherein the dissolvable packaging material dissolves and the tire-enhancement solute mixes with the solvent to form an anti-corrosion product.

2. The method of claim 1, wherein the ratio of solute weight to solvent volume is about 0.07 kg per liter, or 0.6 pounds per gallon.

3. The method of claim 1, further comprising: enclosing one or more containers in a moisture-barrier material.

4. A method of making an anti-corrosive tire-enhancement product, comprising:
  portioning a weight of a solute comprising a tire-enhancement anti-corrosion solute, wherein the solute further comprises at least one of zeolites or hydroxyethyl cellulose;
  providing a container having an inside space defined by walls of a dissolvable packaging material; and
  encasing the portion of anti-corrosion solute in the interior space defined by the walls of the dissolvable packaging material, wherein the interior space defined by the walls of the dissolvable packaging material does not contain non-soluble material in a sufficient amount to serve as a tire sealant; and further comprising adding a volume of the solvent sufficient to fill at least half of the tire volume.

\* \* \* \* \*